Patented Nov. 7, 1950

2,529,152

UNITED STATES PATENT OFFICE 2,529,152

PROCESS FOR EXTRACTION OF INSULIN

Reginald Lindsay Grant, London, England, assignor to Burroughs Wellcome & Co. (U. S. A.) Inc., New York, N. Y., a corporation of New York No Drawing. Application December 6, 1946, Serial No. 714,657. In Great Britain April 12, 1943

Section 1, Public Law 690, August 8, 1946
Patent expires April 12, 1963

5 Claims. (Cl. 167—75)

This invention relates to processes for the extraction and purification of the anti-diabetic hormone of the pancreatic gland known as insulin.

The object of the invention is to increase the efficiency of the extraction process, so that the yield of insulin may be increased, whereby operating costs may be reduced and in some cases it may be possible to utilize batches of pancreas of insulin content lower than usually considered essential for commercial working. A further object is to secure a purer product at the conclusion of the extraction step, so that subsequent purification steps may be reduced, thereby reducing the costs and insulin losses incident to such purification steps.

According to the customary insulin extraction processes, minced pancreas is extracted with 65-95% ethyl alcohol (giving with the water in the glands an aqueous 60-70% alcoholic extract) in the presence of a suitable acid or alkali, generally hydrochloric acid or sodium bicarbonate. After removal of solid material by a suitable filter or centrifuge, the acidified filtrate is either evaporated directly under partial vacuum or first subjected to partial precipitation to remove inert material (according to the acid or alkali used during extraction). After removal of the alcohol by evaporation, the fat is removed either by chilling or by extracting with a suitable water-immiscible fat-soluble solvent. The crude insulin is then precipitated by one of the established methods (for example by precipitation with sodium chloride or as the picrate with picric acid).

By research and experiment we have found that a fat-like fraction can be removed either before evaporation or after partial evaporation. The constitution of this fraction varies appreciably with the condition of the pancreatic glands and the method adapted for extracting them. Allthough described as fat-like, the bulk of the material consists of fatty acids; the amount of true fat present is frequently not more than about 4%.

In the manufacture of insulin, the principal loss of the hormone takes place during evaporation, due to destruction by enzyme action. I find that the fat-like fraction frequently contains a substance or substances which directly or indirectly increases this destruction. By removal of this fat-like fraction better and more consistent yields of insulin are obtained.

Unlike most true animal fats, the greater part of this fat-like fraction is fairly readily soluble in alcohol of about 70%, but only very sparingly soluble in alcohol at about 40%, though the exact strength required varies somewhat with different batches of pancreas. Accordingly, my invention comprises acidifying the alcoholic extract (if it is not already acid), reducing the alcoholic strength to a point at which the fat-like material is no longer soluble in the liquor and separates out, removing it together with substantially all material dissolved or suspended therein and subsequently treating the refining liquor to recover insulin and alcohol therefrom. Before discarding the fat-like material, it is washed with a little acidified water to remove any insulin.

The simplest way of reducing the alcohol content is to add water to the liquor. Sufficient water is added to effect separation of the fat-like layer; excess is avoided as it unnecessarily increases the volume of the liquid and may delay separation. A better procedure is to remove a portion of the alcohol under reduced pressure in an evaporator (say a Kestner film evaporator; with the water current at about 75°-85° C. this results in the temperature of the alcoholic solution being maintained just below 52° C.), reducing the strength of the remaining liquor to an alcoholic content of about 20-40%. During this or any subsequent evaporation the liquor should be sufficiently acidic to be between pH 2 and 4 (glass electrode). An alkaline alcoholic extract, such as that obtained by the sodium bicarbonate method can be acidified with sulphuric acid. Using this acid, a rapid and sharp separation of the fat-like material takes place after reducing the alcohol content to 20-40%. The fat-like material does not separate sharply or rapidly from some acid extracts (such as hydrochloric acid extracts) after reducing the alcoholic content to 20-40%; but in such cases separation can be effected either by a suitable centrifuge or by reducing the acidity to about pH 4-6. After removal of the fat-like material; the clear liquor should be reacidified to about pH 3 before carrying out further evaporations.

After removal of the fat-like fraction, two procedures can be adopted. One is to evaporate off the remainder of the alcohol under reduced pressure, maintaining the acidity between pH 2.5-4.1. The concentrate is filtered bright and the insulin is precipitated as the picrate or by any of the established methods. A second procedure is to reduce the alcohol content below 25 per cent (preferably below 20%), either by evaporation or addition of water and then precipitate the insulin as insulin picrate with excess picric acid.

Contrary to what has been supposed hitherto, we find that insulin picrate will separate almost completely under these conditions, despite the presence of the alcohol. We found that a 0.5% solution of insulin was precipitated almost quantitatively as insulin picrate by the addition of excess picric acid in the presence of alcohol up to 44 per cent by volume or 37 per cent by weight. The exact strength of alcohol from which insulin picrate can be precipitated quantitatively depends upon the purity of the insulin (impure insulin picrate can be more soluble than pure insulin picrate), the insulin content of the solution, the temperature and the hydrogen ion concentration of the solution. The most important factor is a sufficient excess of picric acid.

What I claim is:

1. In the manufacture of insulin, the process comprising acidifying an aqueous-alcoholic extract of pancreas gland containing from 60 to 70% by weight of alcohol, reducing the alcoholic strength of the extract to about 20 to 40% by weight of alcohol, adjusting the pH of the extract to about 4 to 6, separating from the extract a fat-like fraction which is no longer soluble therein under the conditions specified, and further treating the remaining liquor to recover insulin and alcohol therefrom.

2. The process of claim 1 wherein the alcoholic extract is reduced in concentration by the addition of water.

3. The process of claim 1 wherein the alcoholic extract is reduced in concentration by the partial evaporation of alcohol.

4. In the manufacture of insulin, taking an aqueous-ethyl alcoholic extract of pancreas gland containing from 60 to 70% by weight of alcohol, adjusting the pH thereof to 2 to 4, evaporating alcohol therefrom under reduced pressure until the extract contains from 20 to 40% by weight of alcohol, adjusting the pH of the extract to 4 to 6, separating from the extract a fat-like fraction thereof which is no longer soluble therein under the conditions specified, adjusting the pH of the remaining extract to 2 to 4, and treating it to recover insulin and alcohol therefrom.

5. The process claimed in claim 4 in which the process to recover insulin from the extract after removal of the fat-like fraction therefrom and re-acidification thereof comprises reduction of the content of alcohol therein to less than 25% by weight and precipitation of insulin as insulin picrate by addition to the extract of an excess of picric acid.

REGINALD LINDSAY GRANT.

REFERENCES CITED

The following references are of record in the file of this patent:

UNITED STATES PATENTS

| Number | Name | Date |
|---|---|---|
| 1,669,328 | Dudley | May 8, 1928 |
| 2,115,418 | Dragstedt | Apr. 26, 1938 |
| 2,353,016 | Daughenbaugh | July 4, 1944 |